United States Patent
Majumder et al.

(10) Patent No.: US 10,291,024 B2
(45) Date of Patent: May 14, 2019

(54) CONTROL OF A MICROGRID

(71) Applicant: ABB Schweiz AG, Baden (CH)

(72) Inventors: Ritwik Majumder, Västerås (SE);
Joydeep Mukherjee, Västerås (SE);
Eyke Liegmann, Aachen (DE)

(73) Assignee: ABB Schweiz AG, Baden (CH)

( * ) Notice: Subject to any disclaimer, the term of this patent is extended or adjusted under 35 U.S.C. 154(b) by 62 days.

(21) Appl. No.: 15/522,524

(22) PCT Filed: Nov. 4, 2014

(86) PCT No.: PCT/EP2014/073659
§ 371 (c)(1),
(2) Date: Apr. 27, 2017

(87) PCT Pub. No.: WO2016/070906
PCT Pub. Date: May 12, 2016

(65) Prior Publication Data
US 2018/0054055 A1    Feb. 22, 2018

(51) Int. Cl.
*H02J 3/06* (2006.01)
*H02J 3/32* (2006.01)
*H02J 3/38* (2006.01)

(52) U.S. Cl.
CPC ............... *H02J 3/06* (2013.01); *H02J 3/32* (2013.01); *H02J 3/38* (2013.01); *H02J 3/381* (2013.01); *H02J 2003/388* (2013.01)

(58) Field of Classification Search
None
See application file for complete search history.

(56) References Cited

U.S. PATENT DOCUMENTS

| | | | |
|---|---|---|---|
| 2010/0185336 A1 | 7/2010 | Rovnyak et al. | |
| 2012/0166001 A1* | 6/2012 | Park | H02J 3/14 700/287 |
| 2013/0051498 A1* | 2/2013 | Taft | G01R 19/2513 375/340 |

(Continued)

FOREIGN PATENT DOCUMENTS

| | | |
|---|---|---|
| CN | 102394497 A | 3/2012 |
| CN | 103560538 A | 2/2014 |

(Continued)

OTHER PUBLICATIONS

Written Opinion of the International Preliminary Examining Authority Application No. PCT/EP2014/073659 dated Sep. 30, 2016 5 Pages.

(Continued)

*Primary Examiner* — Whitney Moore
(74) *Attorney, Agent, or Firm* — Whitmyer IP Group LLC

(57) ABSTRACT

A control method performed in a microgrid. The microgrid includes at least one electrical power source and/or configured for injecting electrical power into the microgrid, a first point of common coupling (PCC) configured for allowing a first power flow between the microgrid and a first power grid, and a second PCC configured for allowing a second power flow between the microgrid and a second power grid. The method includes obtaining information about a change in the first power flow, and controlling the second power flow based on the obtained information.

14 Claims, 2 Drawing Sheets

(56) References Cited

U.S. PATENT DOCUMENTS

| | | | |
|---|---|---|---|
| 2013/0187454 A1* | 7/2013 | Timbus | H02J 3/381 307/23 |
| 2014/0028090 A1 | 1/2014 | Ueki et al. | |
| 2014/0032000 A1* | 1/2014 | Chandrashekhara | H02J 3/382 700/292 |
| 2014/0277788 A1 | 9/2014 | Forbes, Jr. | |
| 2016/0087441 A1* | 3/2016 | Matan | H02J 3/382 307/24 |

FOREIGN PATENT DOCUMENTS

| | | |
|---|---|---|
| CN | 103595052 A | 2/2014 |
| EP | 2521237 A1 | 11/2012 |
| EP | 2937243 A1 | 10/2015 |
| WO | 2013015773 A1 | 1/2013 |
| WO | 2014096468 A1 | 6/2014 |

OTHER PUBLICATIONS

International Preliminary Report on Patentability Application No. PCT/EP2014/073659 dated Jan. 19, 2017 6 Pages.
International Search Report and Written Opinion of the International Searching Authority Application No. PCT/EP2014/073659 Completed Dated: Jun. 22, 2015; dated Jun. 30, 2015 10 Pages.
European Office Action Application No. 14 793 843.5 dated Dec. 7, 2018 3 pages.

\* cited by examiner

CONTROL OF A MICROGRID

TECHNICAL FIELD

The present disclosure relates to a control method in an electrical microgrid having multiple points of common coupling (PCC) with one or several other electrical power grid(s).

BACKGROUND

A microgrid is a localized grouping of electricity generation, energy storage, and loads that normally operates connected to a traditional centralized grid (macrogrid) via a PCC. This single point of common coupling with the macrogrid can be disconnected, islanding the microgrid. Microgrids are part of a structure aiming at producing electrical power locally from many small energy sources, distributed generators (DGs). In a microgrid, a DG is connected via a converter which controls the output of the DG, i.e. the current injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection is lost during grid fault and the microgrid is islanded.

During islanding, there is a risk of imbalance in the microgrid due to the loss of power import from grid as well as loss of voltage control by the grid. For voltage control it is required to change control mode of the DGs. The power balancing is solved by fast storage action and immediate load shedding schemes.

In an AC microgrid, the frequency is the same everywhere in steady state while voltage may differ depending on the power flow. However, in a microgrid with a continuous change in DG output, load switching and low inertia, there is continuous frequency and voltage fluctuation to a small scale. The deviations are larger during large transients (i.e. DG fault etc.). Frequency and voltage stability relates to minimum oscillations and overshoot with ability to come back to initial value (or any other steady state value within acceptable deviation) after a disturbance.

A microgrid with multiple DGs and loads requires several switches at different level to connect and disconnect to the main power grid as well as different network parts within the microgrid. The automatic disconnections by these switches are aimed for system protection. Planned connections and disconnections are required for optimized operation ensuring power balance and resynchronization maintaining acceptable system dynamics in voltage, frequency and power oscillations. Before reconnection of a network to the microgrid resynchronization with voltage magnitude, phase angle and frequency matching is performed to ensure stability of the microgrid at reconnection.

A microgrid may have more than one PCC. In that case, power transfer may still occur over one of the PCCs if the microgrid is islanded at another of the PCCs. Typically, the power transfer will then increase substantially over the PCC which is still connected to compensate for the islanding. Similarly, if an islanded PCC is reconnected, then the power transfer over the other, already connected, PCC will typically drop substantially.

SUMMARY

It is an objective of the present invention to provide an improved control of a microgrid when the microgrid has a plurality of PCCs.

It is a problem with prior art microgrids that they typically only have one PCC, which makes them more vulnerable to islanding at that single PCC. Using a plurality of PCCs provides redundancy and also flexibility in enabling more than two power grids, including the microgrid, to be connected to each other and for transferring power between them. However, the inventors have realised that using multiple PCCs introduces additional challenges for the control of the microgrid. For instance, the power flow over a second PCC is affected by the power flow over a first PCC. This is even more pronounced if the microgrid is islanded or resynchronised at the first PCC, resulting in a transient power flow at the second PCC. This may lead to imbalances in the microgrid, and possibly also in the power grid with which the microgrid is connected via the second PCC especially if it is a weak grid or another microgrid.

By means of the present invention, these problems are alleviated by controlling the power flow over the second PCC taking into account a change in the power flow over the first PCC. The change in power flow over the first PCC may be unintentional, e.g. if the first PCC is islanded due to a technical malfunction, in which case the change is observed by sensor measurements and the control system of the microgrid can act accordingly to control the power flow over the second PCC. Alternatively, the change in power flow over the first PCC may be intentional, e.g. planned islanding or resynchronisation of the microgrid at the first PCC, in which case the control system may control the power flows over both the first and second PCCs simultaneously as desired.

According to an aspect of the present invention, there is provided a control method performed in a microgrid. The microgrid comprises at least one electrical power source, e.g. an electrical generator or an electrical storage, configured for injecting electrical power into the microgrid. The microgrid also comprises a first PCC configured for allowing a first power flow between the microgrid and a first power grid, e.g. a national power distribution grid or another microgrid. The microgrid also comprises a second PCC configured for allowing a second power flow between the microgrid and a second power grid, same or different than the first power grid. The method comprises obtaining information about a change in the first power flow. The method also comprises controlling the second power flow based on the obtained information.

According to another aspect of the present invention, there is provided a control system for a microgrid. The control system is configured for a microgrid which comprises at least one electrical power source, e.g. an electrical generator or an electrical storage, configured for injecting electrical power into the microgrid. The microgrid also comprises a first point of common coupling (PCC) configured for allowing a first power flow between the microgrid and a first power grid, e.g. a national power distribution grid or another microgrid. The microgrid also comprises a second PCC configured for allowing a second power flow between the microgrid and a second power grid, same or different than the first power grid. The control system is configured for obtaining information about a change in the first power flow, and for controlling the second power flow based on the obtained information.

According to another aspect of the present invention, there is provided a microgrid comprising at least one electrical power source configured for injecting electrical power into the microgrid. The microgrid also comprises a first PCC configured for allowing a first power flow between the microgrid and a first power grid. The microgrid also comprises a second PCC configured for allowing a second power flow between the microgrid and a second power grid. The microgrid also comprises an embodiment of the control system of the present disclosure.

According to another aspect of the present invention, there is provided a computer program product comprising computer-executable components for causing a control system of a microgrid (1) to perform the method of the invention when the computer-executable components are run on processor circuitry comprised in the control system.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

An objective of the present invention is to have control over the power flow(s) of the other (second) PCC while e.g. executing planned island or resynchronization at a particular (first) PCC in a multiple PCC microgrid. Embodiments of the method can be summarized as below:

For resynchronization, voltage and transient control at the first PCC is achieved either by adjusting the power output of power sources in the microgrid, or by means of a PCC interfacing converter at the first PCC. At the same time, power flow control of the second (and any third, fourth etc.) PCC is also performed either by adjusting the power output of power sources in the microgrid, or by means of a PCC interfacing converter at the second PCC.

For planned islanding, transient and power control to zero at the first PCC is achieved either by adjusting the power output of power sources in the microgrid, or by means of a PCC interfacing converter at the first PCC. At the same time, power flow control of the second (and any third, fourth etc.) PCC is also performed either by adjusting the power output of power sources in the microgrid, or by means of a PCC interfacing converter at the second PCC.

It is noted that voltage control at the first PCC may be used for resynchronization, while power control at the first PCC may be used for planned islanding. The control may be done by adjusting the power and/or voltage references of different power sources, such as distributed generators or electrical power storages, connected in different parts of the microgrid. For instance, a power source which injects power/voltage close to a PCC may affect the power/voltage at that PCC more than at any other PCC in the microgrid, or an electrical power storage at a PCC may decrease the power at that PCC by storing power.

A benefit of the proposed method lies in reduced system oscillations in the microgrid as well as uninterrupted grid connection and grid power flow in the second PCC. This is important for microgrid to supply critical loads in the microgrid with power while the microgrid is connected to a weak power grid or another microgrid via the second PCC.

Figure 1:
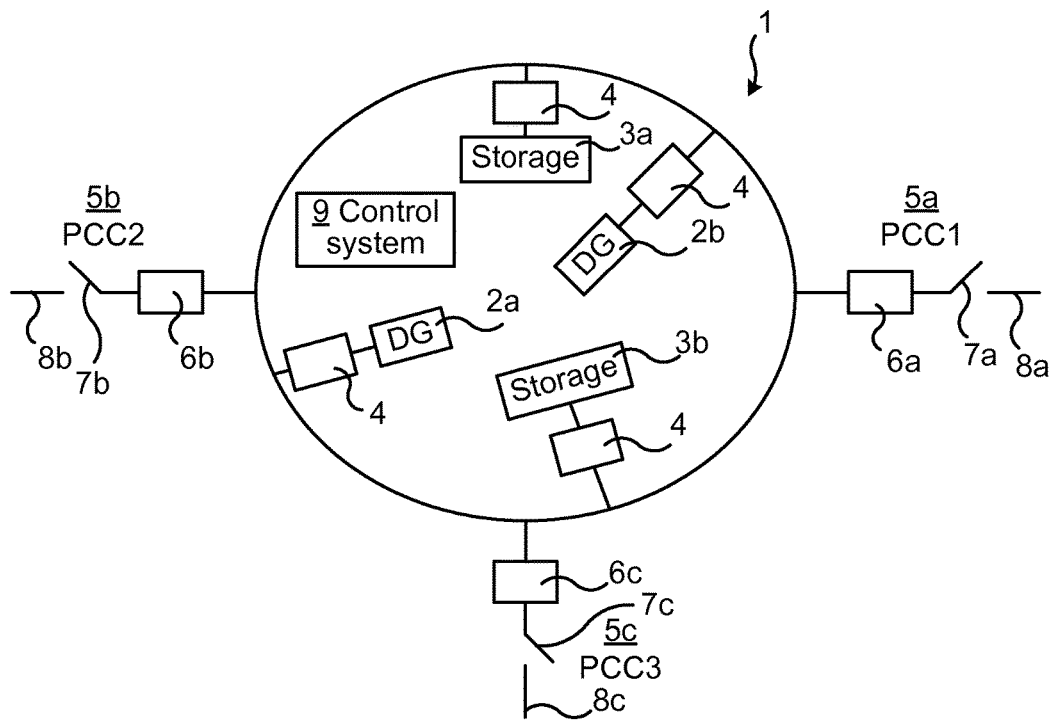
FIG. 1 is a schematic circuit diagram of an embodiment of a microgrid of the present disclosure.

FIG. 1 is a schematic illustration of a microgrid 1 connected to a first power grid 8a at a first PCC 5a, to a second power grid 8b at a second PCC 5b, and to a third power grid 8c at a third PCC 5c. At each PCC 5 there may be a circuit breaker or other switch 7a, 7b and 7c, respectively, for connecting or disconnection (islanding) the microgrid at the respective PCC 5. The microgrid 1 comprises a plurality of distributed generators (DG) 2, a first DG 2a and a second DG 2b, as well as a plurality of power storages 3, a first storage 3a and a second storage 3b. Each of the DGs 2 may e.g. be a wind turbine or solar panel, and each of the storages 3 may e.g. be a battery or a flywheel. The DGs 2 and storages 3 are herein communally called electrical power sources, since they are configured for injecting power into the microgrid 1. The storages 3 are also configured for withdrawing and storing power from the microgrid as desired. The microgrid 1 may also comprise any number of loads (not shown) which consume electrical power which has been injected into the microgrid by the power sources 2 and/or 3 or by the power grids 8. Each of the power sources 2 and 3 are typically connected in the microgrid 1 via an electrical converter 4 which may regulate the power injected into, or withdrawn from, the microgrid, and/or the voltage provided, by the respective power source.

A control system 9 is comprised in the microgrid for controlling the same. The control system 9 may comprise a central control unit or be distributed within the microgrid, e.g. collocated with the power sources 2 and/or 3, or a combination thereof. The control system may as input receive measurements of e.g. voltage, frequency, power flow etc. from different parts of the microgrid, as well as operational input from an operator e.g. to island or resynchronize the microgrid or to increase or decrease the power flow over one or several of the PCCs 5.

A central microgrid control may coordinate the storages 3 and DGs 2 within the microgrid 1 as well as the interfacing switches 7 at the PCC 5 for the proposed method. The voltage and power control may then be performed with central error calculation and distribution of the error among the power sources 2 and 3 within the microgrid 1. The distributed errors may then be added to the power/voltage reference values for the power sources and integrated to the primary control of said power sources.

With decentralized control, the proposed method may be implemented by individual contribution of the power sources 2 and 3. The voltage and power control may then be achieved by communicating the voltage or power error to each power source. The DGs 2 and/or storages 3 based on their individual rating and location (based on proximity to PCC 5) may be controlled in an aggregate, for the preferred PCC power/voltage control.

Alternatively or additionally, the power flow at a PCC 5 may be controlled by means of a converter 6 interfacing said PCC. In the embodiment of FIG. 1, each of the PCCs 5 is associated with a converter 6a, 6b and 6c, respectively. For instance, while the first interfacing converter 6a is used to control the power flow over the first PCC 5a, e.g. for resynchronization or islanding of the first PCC, the second interfacing converter 6b is used to control the power flow over the second PCC 5b, e.g. to be constant regardless of the resynchronization or islanding occurring at the first PCC 5a. For improved control, it may be convenient to use an interfacing converter 6 for each PCC 5 in the microgrid. However, this may be less desirable due to increased cost and need to upgrade old microgrids, why it may instead be preferable to control the power flows over the PCCs 5 by means of the power sources 2 and/or 3. A combination of control by means of both power sources and interfacing converters 6 is also considered.

According to an aspect of the present invention, there is thus provided a control system 9 for a microgrid 1. The control system 9 is configured for a microgrid which comprises at least one electrical power source 2 and/or 3, e.g. an electrical generator 2 or an electrical storage 3, configured for injecting electrical power into the microgrid 1. The microgrid which the control system 9 is configured for also comprises a first PCC 5a configured for allowing a first power flow between the microgrid 1 and a first power grid 8a, e.g. a national power distribution grid or another microgrid. The microgrid which the control system 9 is configured for also comprises a second PCC 5b configured for allowing a second power flow between the microgrid and a second power grid 8b, e.g. a national power distribution grid or another microgrid same or different than the first power grid 8a. The control system 9 is configured for obtaining information about a change in the first power flow, and for controlling the second power flow based on the obtained information.

Figure 2:
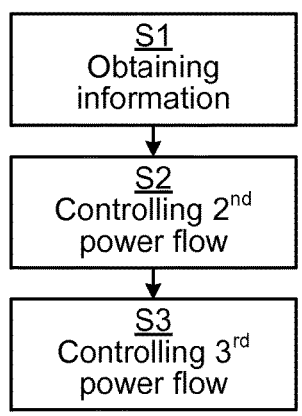
FIG. 2 is a schematic flow chart of an embodiment of the method of the present disclosure.

FIG. 2 is a schematic flow chart of an embodiment of the method of the present disclosure. The method is performed in a microgrid 1. The microgrid comprises at least one electrical power source 2 and/or 3 configured for injecting electrical power into the microgrid. The microgrid 1 also comprises a first PCC 5a configured for allowing a first power flow between the microgrid and a first power grid 8a. The microgrid 1 also comprises a second PCC 5b configured for allowing a second power flow between the microgrid and a second power grid 8b. In accordance with the method, information about a change in the first power flow is obtained S1, e.g. by sensor measurements or by controlling the first power flow. Then, the second power flow is controlled S2 based on the obtained S1 information. In some embodiments of the method, if the microgrid also comprises a third PCC 5c, the method may further comprise controlling S3 the third power flow over the third PCC 5c based on the obtained S1 information about the change in the first power flow and/or on the controlling S2 of the second power flow.

The control system 9 typically comprises processor circuitry configured for running a computer program comprising code able to cause the control system to perform an embodiment of the method of the present invention. The control system 9 also typically comprises a data storage such as a memory, in which the computer program is stored. The data storage may then be regarded as a computer program product. The computer program product comprises a computer readable medium comprising a computer program in the form of computer-executable components. The computer program/computer-executable components may be configured to cause the control system 9, e.g. as discussed herein, to perform an embodiment of the method of the present disclosure. The computer program/computer-executable components may be run on the processor circuitry of the control system for causing it to perform the method. The computer program product may e.g. be comprised in a data storage unit or memory comprised in the control system 9 and associated with the processor circuitry. Alternatively, the computer program product may be, or be part of, a separate, e.g. mobile, storage means, such as a computer readable disc, e.g. CD or DVD or hard disc/drive, or a solid state storage medium, e.g. a RAM or Flash memory.

In some embodiments of the present invention, the obtaining information S1 is part of controlling the change in the first power flow. Thus, the change in the first power flow may be a planned, possibly future, change which is controlled by the control system 9 of the microgrid.

In some embodiments of the present invention, the controlling S2 of the second power flow comprises controlling the second power flow to be constant despite the change in the first power flow, or to be changed step-wise or slope-wise. It may be convenient to control the second power flow to be constant, regardless of the change of the first power flow, e.g. to avoid destabilising the second power grid 8b, especially if the second power grid is a weak grid e.g. another microgrid. In some other embodiments, it may be convenient to increase (e.g. in case of islanding at the first PCC 5a) or decrease (e.g. in case of reconnection/resynchronization at the first PCC 5a) the second power flow in view of the changed first power flow in order to stabilize the microgrid 1. By means of embodiments of the present invention, this increase/decrease of the second power flow may be achieved in a controlled manner, e.g. stepwise or slope-wise to avoid fast or uncontrolled transient power fluctuations in the microgrid 1 or in the second power grid 8b.

In some embodiments of the present invention, the change in the first power flow is to zero, corresponding to islanding of the microgrid 1 at the first PCC 5a. In some other embodiments, the change in the first power flow is from zero, corresponding to resynchronisation after islanding of the microgrid 1 at the first PCC 5a.

In some embodiments of the present invention, the controlling S2 of the second power flow comprises controlling the second power flow by adjusting the injection of electrical power by the at least one electrical power source 2 and/or 3. Additionally or alternatively, in some embodiments of the present invention, the controlling S2 of the second power flow comprises controlling the second power flow by means of said interfacing converter 6b.

In some embodiments of the present invention, the first power grid 8a is connected to the second power grid 8b for allowing electrical power to flow there between. The first and second power grids 8 may in some embodiments substantially be parts of the same power grid.

In some embodiments of the present invention, the at least one electrical power source comprises a DG 2 and/or a power storage 3.

Example

Figure 3:
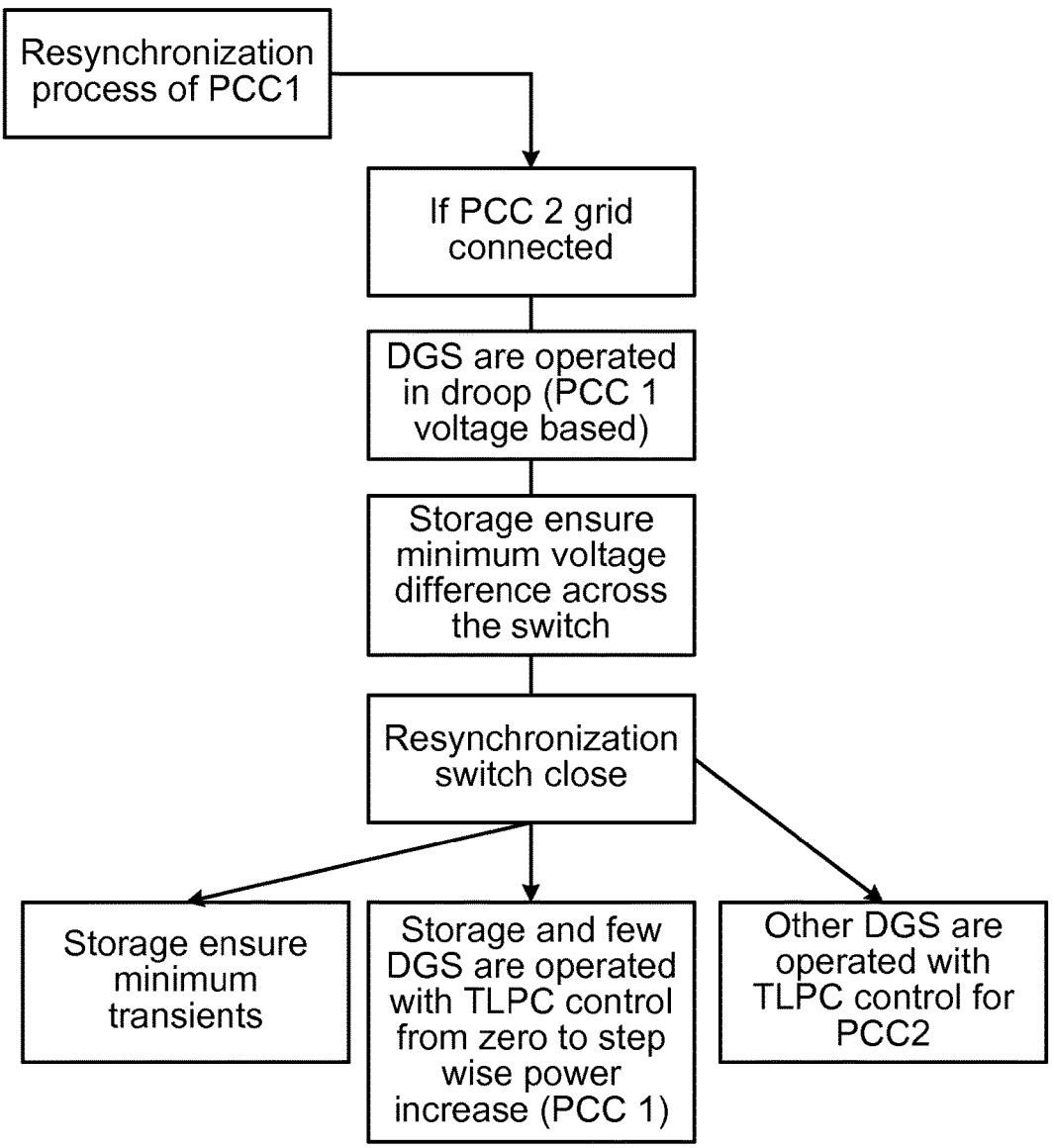
FIG. 3 is a schematic flow chart of an example embodiment of the method of the present disclosure.

FIG. 3 is a flow chart of an example embodiment of the inventive method. The control method of FIG. 3 assumes that the microgrid has two PCCs 5. However, the method is applicable for any number of PCCs.

The premises are that the microgrid 1 is to be resynchronized with the first power grid 8a at the first PCC (PCC1) 5a while the microgrid 1 is connected at (i.e. transmits power over) the second PCC (PCC2) 5b with the second power grid 8b. PCC1 is reconnected back with the main utility grid, when the microgrid remains grid-connected at PCC2. DGs 2 are then operated in droop or voltage control mode for controlling the voltage at the first PCC 5a in view of the voltage of the first power grid 8a. Typically, during islanding at PCC1, all the DGs 2 operate in voltage control mode collectively maintaining the PCC1 microgrid voltage close to the first power grid voltage thus enabling a smooth resynchronisation. At least one energy storage 3 may be used to ensure a minimal voltage difference over the switch 7a at the first PCC 5a. The voltage magnitude, phase and frequency difference parameters at either end of the static-switch 7a terminals are constantly compared by the switching control algorithm, which recloses when these fall within a set threshold. Then the switch 7a closes, reconnecting the microgrid 1 at the first PCC 5a. Following this reconnection at PCC1, the DGs 2 instantaneously change-over to Tie-line power control (TLPC) mode. Segmentation of assets takes place and while some of the DGs operate to enable a stepwise power increment at PCC1 tie-line; other DGs operate to hold the power import constant at PCC2 at values equal to that at the instant of reconnection. Alternatively, the other DGs 2 operate to produce an equal step-wise decrease of power import taking place at the PCC2 tie-line in response to the stepwise power increment at PCC1 tie-line. Thus, during the reconnection, the energy storage(s) 2 may reduce any transient power fluctuations, some power sources 2 and/or 3 may operate in TLPC mode to e.g. step-wise increase the power flow at the first PCC 5a from zero, and some other power sources 2 and/or 3 may operate in TLPC mode for controlling the power flow over the second PCC 5b.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A control method performed in a microgrid comprising:
   at least one electrical power source configured for injecting electrical power into the microgrid;
   a first point of common coupling, PCC, configured for allowing a first power flow between the microgrid and a first power distribution grid; and
   a second PCC configured for allowing a second power flow between the microgrid and a second power distribution grid;
   the method comprising:
   obtaining (S1) information about a change in the first power flow; and
   controlling (S2) the second power flow based on the obtained (S1) information about the change in the first power flow through the first PCC.

2. The method of claim 1, wherein the obtaining information (S1) includes controlling the change in the first power flow simultaneously with controlling (S2) the second power flow.

3. The method of claim 2, wherein the controlling (S2) of the second power flow comprises controlling the second power flow to be constant despite the change in the first power flow, or to be changed step-wise or slope-wise.

4. The method of claim 1, wherein the controlling (S2) of the second power flow comprises controlling the second power flow to be constant despite the change in the first power flow, or to be changed step-wise or slope-wise.

5. The method of claim 1, wherein the change in the first power flow is to zero, corresponding to islanding of the microgrid at the first PCC.

6. The method of claim 1, wherein the change in the first power flow is from zero, corresponding to resynchronisation after islanding of the microgrid at the first PCC.

7. The method of claim 1, wherein the controlling (S2) of the second power flow comprises controlling the second power flow by adjusting the injection of electrical power by the at least one electrical power source.

8. The method of claim 1, wherein the microgrid further comprises a converter interfacing the second PCC;
   wherein the controlling (S2) of the second power flow comprises controlling the second power flow by means of said interfacing converter.

9. The method of claim 1, wherein the first power distribution grid is connected to the second power distribution grid for allowing electrical power to flow there between.

10. The method of claim 1, wherein the microgrid further comprises a third PCC configured for allowing a third power flow between the microgrid and a third power distribution grid;
    wherein the method further comprises controlling (S3) the third power flow based on the obtained (S1) information about the change in the first power flow and/or on the controlling (S2) of the second power flow.

11. The method of claim 1, wherein the at least one electrical power source comprises a distributed generator and/or a power storage.

12. A computer program product comprising computer-executable components for causing a control system of a microgrid to perform the method of claim 1 when the computer-executable components are run on processor circuitry comprised in the control system.

13. A control system configured for a microgrid, said microgrid comprises:
    at least one electrical power source configured for injecting electrical power into the microgrid;
    a first point of common coupling, PCC, configured for allowing a first power flow between the microgrid and a first power distribution grid; and
    a second PCC configured for allowing a second power flow between the microgrid and a second power distribution grid;
    the control system being configured for:
    obtaining information about a change in the first power flow; and
    controlling the second power flow based on the obtained information about the change in the first power flow through the first PCC.

14. A microgrid comprising:
    at least one electrical power source configured for injecting electrical power into the microgrid;
    a first point of common coupling, PCC, configured for allowing a first power flow between the microgrid and a first power distribution grid;
    a second PCC configured for allowing a second power flow between the microgrid and a second power distribution grid; and the control system configured for:
   obtaining information about a change in the first power flow; and
   controlling the second power flow based on the obtained information about the change in the first power flow through the first PCC.

\* \* \* \* \*